United States Patent
Orlando et al.

(10) Patent No.: US 7,290,386 B2
(45) Date of Patent: Nov. 6, 2007

(54) COUNTER-ROTATING GAS TURBINE ENGINE AND METHOD OF ASSEMBLING SAME

(75) Inventors: Robert Joseph Orlando, West Chester, OH (US); Thomas Ory Moniz, Loveland, OH (US)

(73) Assignee: General Electric Company, Schenectady, NY (US)

( * ) Notice: Subject to any disclaimer, the term of this patent is extended or adjusted under 35 U.S.C. 154(b) by 426 days.

(21) Appl. No.: 10/976,497

(22) Filed: Oct. 29, 2004

(65) Prior Publication Data

US 2006/0093467 A1   May 4, 2006

(51) Int. Cl.
*F02C 3/067* (2006.01)

(52) U.S. Cl. ........................ 60/268; 60/39.162; 60/772; 415/65

(58) Field of Classification Search ......... 60/39.162 X, 60/226.1, 268, 772; 415/65, 69
See application file for complete search history.

(56) References Cited

U.S. PATENT DOCUMENTS

| | | | |
|---|---|---|---|
| 2,404,767 A | * | 7/1946 | Heppner ..................... 60/268 |
| 4,159,624 A | * | 7/1979 | Gruner ......................... 60/268 |
| 5,274,999 A | * | 1/1994 | Rohra et al. ................ 60/226.1 |
| 5,307,622 A | * | 5/1994 | Ciokajlo et al. ......... 60/39.162 |
| 5,806,303 A | | 9/1998 | Johnson |
| 5,809,772 A | | 9/1998 | Giffin, III et al. |
| 5,813,214 A | | 9/1998 | Moniz et al. |
| 5,867,980 A | | 2/1999 | Bartos |
| 6,619,030 B1 | | 9/2003 | Seda et al. |
| 6,684,626 B1 | | 2/2004 | Orlando et al. |
| 6,711,887 B2 | | 3/2004 | Orlando et al. |
| 6,732,502 B2 | | 5/2004 | Seda et al. |
| 6,739,120 B2 | | 5/2004 | Moniz et al. |
| 6,763,652 B2 | | 7/2004 | Baughman et al. |
| 6,763,653 B2 | | 7/2004 | Orlando et al. |
| 6,763,654 B2 | | 7/2004 | Orlando et al. |

* cited by examiner

*Primary Examiner*—L. J. Casaregola
(74) *Attorney, Agent, or Firm*—William Scott Andes; Armstrong Teasedale LLP

(57) ABSTRACT

A method for assembling a gas turbine engine that includes providing a low-pressure turbine inner rotor that includes a first plurality of turbine blade rows configured to rotate in a first direction, and rotatably coupling a low-pressure turbine outer rotor to the inner rotor, wherein the outer rotor includes a second plurality of turbine blade rows that are configured to rotate in a second direction that is opposite the first rotational direction of the inner rotor and such that at least one of the second plurality of turbine blade rows is coupled axially forward of the first plurality of turbine blade rows.

15 Claims, 3 Drawing Sheets

COUNTER-ROTATING GAS TURBINE ENGINE AND METHOD OF ASSEMBLING SAME

BACKGROUND OF THE INVENTION

This invention relates generally to aircraft gas turbine engines, and more specifically to counter-rotating gas turbine engines.

At least one known gas turbine engine includes, in serial flow arrangement, a forward fan assembly, an aft fan assembly, a high-pressure compressor for compressing air flowing through the engine, a combustor for mixing fuel with the compressed air such that the mixture may be ignited, and a high-pressure turbine. The high-pressure compressor, combustor and high-pressure turbine are sometimes collectively referred to as the core engine. In operation, the core engine generates combustion gases which are discharged downstream to a counter-rotating low-pressure turbine that extracts energy therefrom for powering the forward and aft fan assemblies. Within at least some known gas turbine engines, at least one turbine rotates in an opposite direction than the other rotating components within the engine At least one known counter-rotating low-pressure turbine has an inlet radius that is larger than a radius of the high-pressure turbine discharge. The increase inlet radius accommodates additional stages within the low-pressure turbine. Specifically, at least one known counter-rotating low-pressure turbine includes an outer rotor having a first quantity of low-pressure stages that are rotatably coupled to the forward fan assembly, and an inner rotor having an equal number of stages that is rotatably coupled to the aft fan assembly.

During engine assembly, such known gas turbine engines are assembled such that the outer rotor is cantilevered from the turbine rear-frame. More specifically, the first quantity of stages of the outer rotor are each coupled together and to the rotating casing, and the outer rotor is then coupled to the turbine rear-frame using only the last stage of the outer rotor, such that only the last stage of the outer rotor supports the combined weight of the outer rotor rotating casing. Accordingly, to provide the necessary structural strength to such engines, the last stage of the outer rotor is generally much larger and heavier than the other stages of the outer rotor. As such, during operation, the performance penalties associated with the increased weight and size may tend to negate the benefits of utilizing a counter-rotating low-pressure turbine.

BRIEF DESCRIPTION OF THE INVENTION

In one aspect, a method for assembling a gas turbine engine is provided. The method includes providing a low-pressure turbine inner rotor that includes a first plurality of turbine blade rows configured to rotate in a first direction, and rotatably coupling a low-pressure turbine outer rotor to the inner rotor, wherein the outer rotor includes a second plurality of turbine blade rows that are configured to rotate in a second direction that is opposite the first rotational direction of the inner rotor and such that at least one of the second plurality of turbine blade rows is coupled axially forward of the first plurality of turbine blade rows.

In another aspect, a counter-rotating rotor assembly is provided. The rotor assembly includes an inner rotor including a first plurality of rows of turbine blades configured to rotate in a first direction, and an outer rotor including a second plurality of rows of turbine blades configured to rotate in a second direction that is opposite the rotational direction of the inner rotor, the outer rotor coupled within the rotor assembly such that at least one of the second plurality of rows of turbine blades is coupled axially forward of the inner rotor first plurality of rows of turbine blades.

In a further aspect, a gas turbine engine is provided. The gas turbine engine includes an inner rotor including a first plurality of rows of turbine blades configured to rotate in a first direction, and an outer rotor including a second plurality of rows of turbine blades configured to rotate in a second direction that is opposite the rotational direction of the inner rotor, the outer rotor is coupled within the rotor assembly such that at least one of the second plurality of rows of turbine blades is coupled axially forward of the inner rotor first plurality of rows of turbine blades.

DETAILED DESCRIPTION OF THE INVENTION

Figure 1:
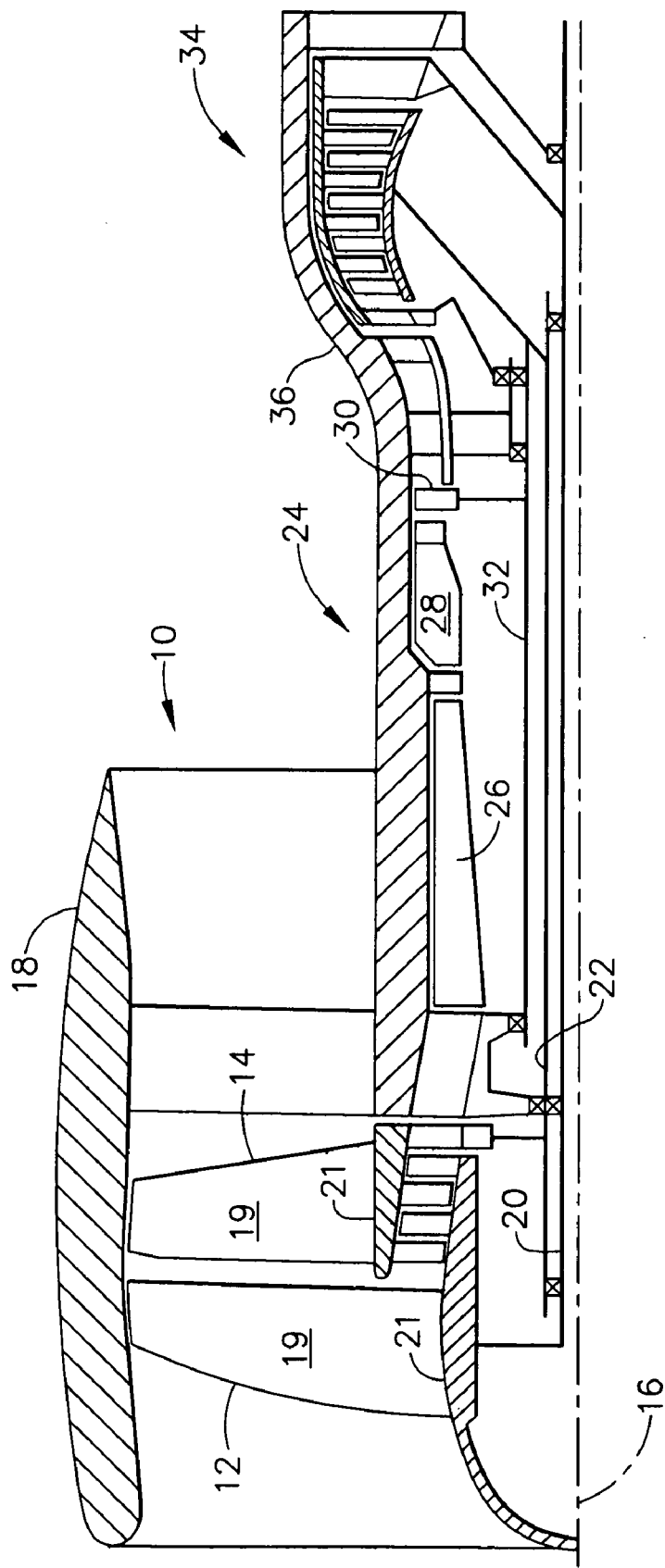
FIG. 1 is a cross-sectional view of a portion of an exemplary gas turbine engine.

FIG. 1 is a cross-sectional view of a portion of an exemplary gas turbine engine 10 that includes a forward fan assembly 12 and an aft fan assembly 14 disposed about a longitudinal centerline axis 16. The terms "forward fan" and "aft fan" are used herein to indicate that one of the fans 12 is coupled axially upstream from the other fan 14. In one embodiment, fan assemblies 12 and 14 are positioned at a forward end of gas turbine engine 10 as illustrated. In an alternative embodiment, fan assemblies 12 and 14 are positioned at an aft end of gas turbine engine 10. Fan assemblies 12 and 14 each include a plurality of rows of fan blades 19 positioned within a nacelle 18. Blades 19 are joined to respective rotor disks 21 that are rotatably coupled through a respective fan shaft 20 to forward fan assembly 12 and through a fan shaft 22 to aft fan assembly 14.

Gas turbine engine 10 also includes a core engine 24 that is downstream from fan assemblies 12 and 14. Core engine 24 includes a high-pressure compressor (HPC) 26, a combustor 28, and a high-pressure turbine (HPT) 30 that is coupled to HPC 26 via a core rotor or shaft 32. In operation, core engine 24 generates combustion gases that are channeled downstream to a counter-rotating low-pressure turbine 34 which extracts energy from the gases for powering fan assemblies 12 and 14 through their respective fan shafts 20 and 22.

Figure 2:
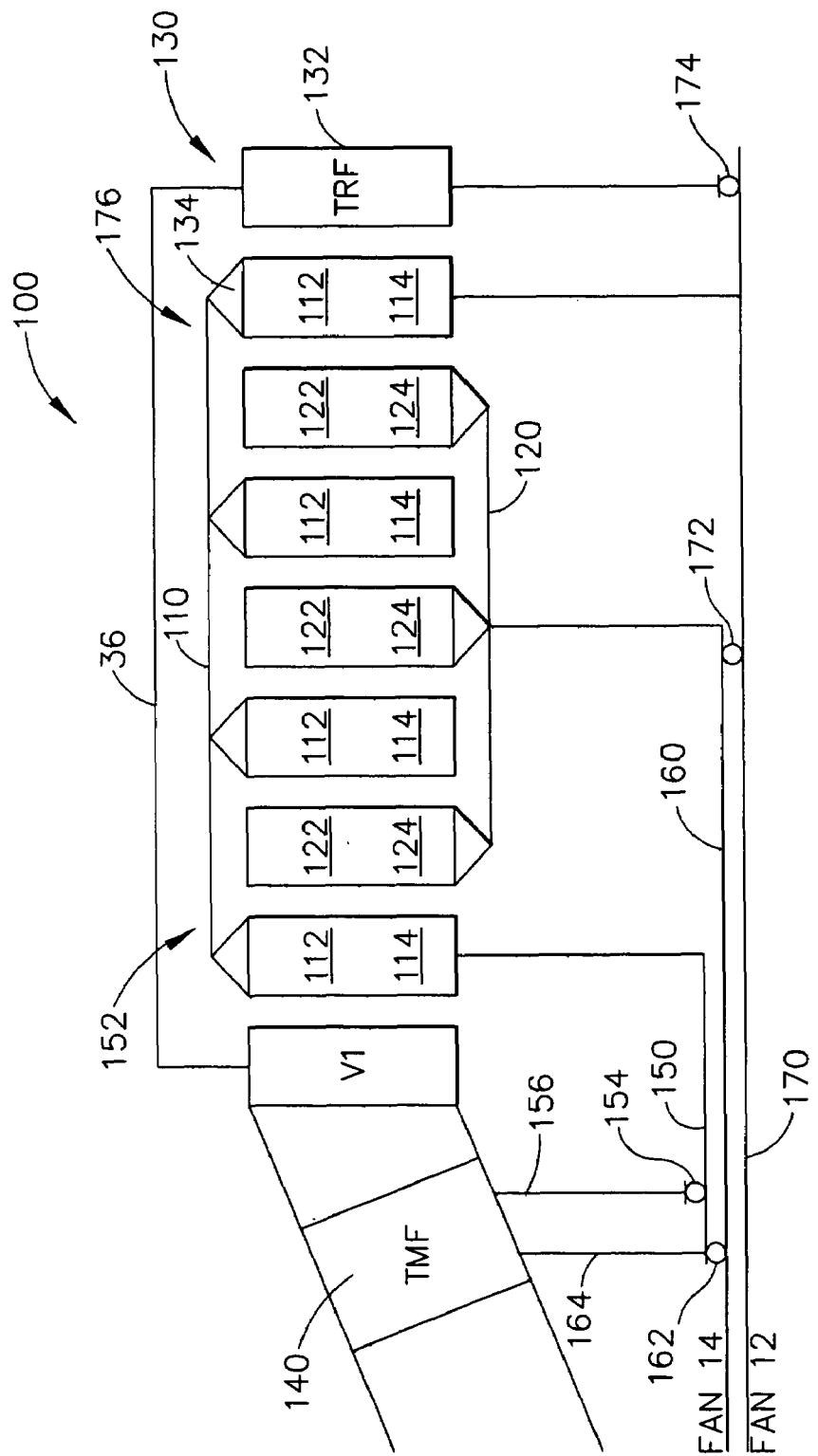
FIG. 2 is a schematic diagram of an exemplary counter-rotating low pressure turbine assembly that can be used with the gas turbine engine shown in FIG. 1.

FIG. 2 is a schematic diagram of a straddle-mounted counter-rotating low-pressure turbine assembly 100 that may be used with a gas turbine engine similar to gas turbine engine 10 (shown in FIG. 1). In the exemplary embodiment, low-pressure turbine 100 includes stationary outer casing 36 that is coupled to core engine 24 downstream from high-pressure turbine 30 (shown in FIG. 1). Low-pressure turbine 100 includes a radially outer rotor 110 that is positioned radially inwardly of outer casing 36. Outer rotor 110 has a generally frusto-conical shape and includes a plurality of circumferentially-spaced rotor blades 112 that extend radially inwardly. Blades 112 are arranged in axially-spaced blade rows or stages 114. Although, the exemplary embodiment illustrates four stages 114, it should be realized that outer rotor 110 may have any quantity of stages 114 without affecting the scope of the method and apparatus described herein. More specifically, outer rotor 110 includes M stages 114 of blades 112.

Low-pressure turbine 100 also includes a radially inner rotor 120 that is aligned substantially coaxially with respect to, and radially inward of, outer rotor 110. Inner rotor 120 includes a plurality of circumferentially-spaced rotor blades 122 that extend radially outwardly and are arranged in axially-spaced rows or stages 124. Although, the exemplary embodiment illustrates three stages, it should be realized that inner rotor 120 may have any quantity of stages without affecting the scope of the method and apparatus described herein. More specifically, inner rotor 120 includes N stages 124 of blades 122. In the exemplary embodiment, M=N+1. Accordingly, and in the exemplary embodiment, outer rotor 110 includes an even number of stages 114 and inner rotor 120 includes an odd number of stages 124 such that outer rotor 110 surrounds and/or straddles inner rotor 120.

In the exemplary embodiment, inner rotor blades 122 extending from stages 124 are axially-interdigitated with outer rotor blades 112 extending from stages 114 such that inner rotor stages 124 extend between respective outer rotor stages 114. Rotor blades 112 and 122 are therefore configured for counter-rotation of the rotors 110 and 120.

In the exemplary embodiment, low-pressure turbine 100 also includes a rotor support assembly 130 that includes a stationary annular turbine rear-frame 132 that is aft of low-pressure turbine outer and inner blades 112 and 122. A rotatable aft frame 134 is positioned aft of outer and inner blades 112 and 122 and upstream from turbine rear-frame 132. Aft frame 134 is coupled to an aft end of outer rotor 110 for rotation therewith and to facilitate providing additional rigidity for supporting blades 112. An annular turbine mid-frame 140 is upstream from outer and inner blades 112 and 122.

Low-pressure turbine 100 also includes a first shaft 150 that is coupled between a forward end 152 of outer rotor 110 and a first shaft bearing 154 that is rotatably coupled to turbine mid-frame 140 via a structural member 156. Specifically, first shaft 150 extends between forward end 152 and first shaft bearing 154 such that the weight of outer rotor 110 is distributed approximately equally about the circumference of gas turbine engine 10 at forward end 152, via structural member 156.

A second shaft 160 extends between inner rotor 120 and fan 14 such that inner rotor 120 is rotatably coupled to fan 14. In the exemplary embodiment, second shaft 160 is positioned radially inward of first shaft 150. A second shaft bearing 162 is coupled to second shaft 160 such that the weight of inner rotor 120 is distributed approximately equally about the circumference of gas turbine engine 10 at forward end 152, via a structural member 164.

Low-pressure turbine 100 also includes a third shaft 170 that rotatably couples fan 12, outer rotor 110, and turbine rear-frame 132 together. More specifically, low-pressure turbine 100 includes a third shaft differential bearing 172 coupled between second shaft 160 and third shaft 170, and a third bearing 174 coupled between third shaft 170 and turbine rear-frame 132. Specifically, third shaft 170 extends between fan 12 and turbine rear-frame 132 such that the weight of outer rotor 110 at an aft end 176 is distributed approximately equally about the circumference of gas turbine engine 10 at aft end 176, via bearing 174 and turbine rear-frame 132. In one embodiment, at least one of first bearing 154, second bearing 162, third differential bearing 172, and third bearing 174 is a foil bearing. In another embodiment, at least one of first bearing 154, second bearing 162, third differential bearing 172, and third bearing 174 is at least one of a roller bearing or a ball bearing.

In the exemplary embodiment, during engine operation, a radial force generated during rotation of outer rotor 110 is transmitted to bearings 154 and 174. Specifically, as low-pressure turbine 100 rotates, bearings 154 and 174 contact turbine mid-frame 140 and turbine rear-frame 132 respectively to facilitate reducing radial movement of outer rotor 110. Since each respective bearing 154 and 174 is coupled to outer casing 36 through turbine mid-frame 140 and turbine rear-frame 132, outer rotor 110 is maintained in a relatively constant radial position with respect to outer casing 36. More specifically, utilizing straddle-mounted low-pressure turbine 100 that includes an odd number of turbine stages 114 and 124 collectively, that are supported at both ends by bearings 154 and 174 respectively, facilitates eliminating the at least one known differential bearing that is coupled between the concentric low-pressure shafts when an even number of total stages are used in at least one known counter-rotating low-pressure turbine. Moreover, utilizing straddle-mounted low-pressure turbine 100 facilitates reducing the weight of gas turbine engine 10 by eliminating a large over-turning moment generated by a known low-pressure turbine.

Figure 3:
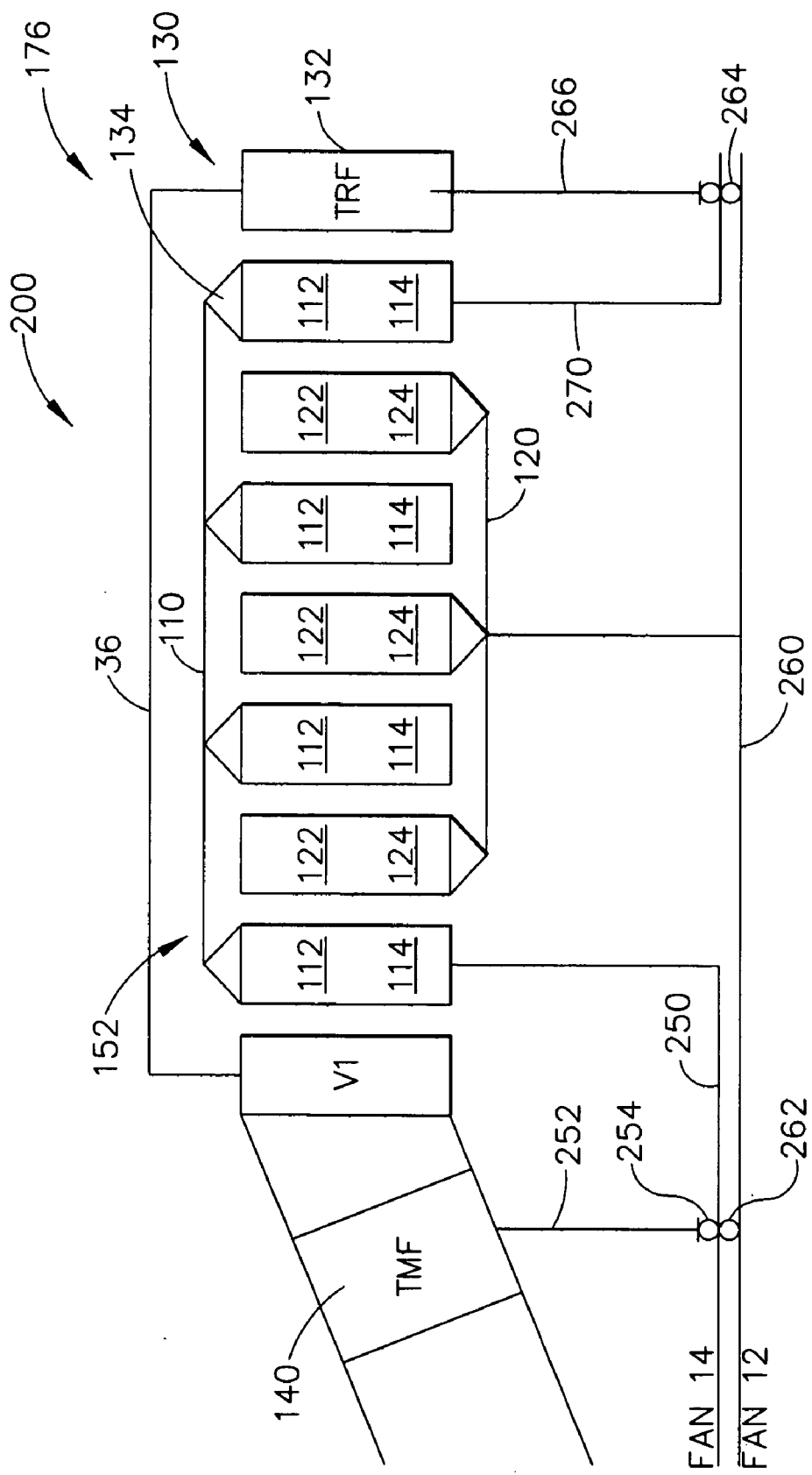
FIG. 3 is a schematic diagram of an exemplary counter-rotating low pressure turbine assembly that can be used with the gas turbine engine shown in FIG. 1.

FIG. 3 is a schematic diagram of a straddle-mounted counter-rotating low-pressure turbine assembly 200 that may be used with a gas turbine engine similar to gas turbine engine 10 (shown in FIG. 1). In the exemplary embodiment, low-pressure turbine 200 includes stationary outer casing 36 that is coupled to core engine 24 downstream from high-pressure turbine 30 (shown in FIG. 1). Low-pressure turbine assembly 200 includes radially outer rotor 110 that is positioned radially inwardly of outer casing 36. Outer rotor 110 has a generally frusto-conical shape and includes plurality of circumferentially-spaced rotor blades 112 that extend radially inwardly. Blades 112 are arranged in axially-spaced blade rows or stages 114. Although, the exemplary embodiment illustrates four stages 114, it should be realized that outer rotor 110 may have any quantity of stages 114 without affecting the scope of the method and apparatus described herein. More specifically, outer rotor 110 includes M stages 114 of blades 112.

Low-pressure turbine 200 also includes radially inner rotor 120 that is aligned substantially coaxially with respect to, and radially inward of, outer rotor 110. Inner rotor 120 includes plurality of circumferentially-spaced rotor blades 122 that extend radially outwardly and are arranged in axially-spaced rows or stages 124. Although, the exemplary embodiment illustrates three stages, it should be realized that inner rotor 120 may have any quantity of stages without affecting the scope of the method and apparatus described herein. More specifically, inner rotor 120 includes N stages 124 of blades 122. In the exemplary embodiment, M=N+1. Accordingly, and in the exemplary embodiment, outer rotor 110 includes an even number of stages 114 and inner rotor 120 includes an odd number of stages 124 such that outer rotor 110 surrounds and/or straddles inner rotor 120.

In the exemplary embodiment, inner rotor blades 122 extending from stages 124 are axially-interdigitated with outer rotor blades 112 extending from stages 114 such that inner rotor stages 124 extend between respective outer rotor stages 114. The blades 112 and 122 are therefore configured for counter-rotation of the rotors 110 and 120.

In the exemplary embodiment, low-pressure turbine 200 also includes rotor support assembly 130 that includes stationary annular turbine rear-frame 132 that is aft of low-pressure turbine outer and inner blades 112 and 122. Rotatable aft frame 134 is positioned aft of outer and inner blades 112 and 122 and upstream from turbine rear-frame 132. Frame 134 is coupled to an aft end of outer rotor 110 for rotation therewith and to facilitate providing additional rigidity for supporting blades 112. Annular turbine mid-frame 140 is upstream from outer and inner blades 112 and 122.

Low-pressure turbine 200 also includes a first shaft 250 that is coupled between forward end 152 of outer rotor 110 and fan 14. More specifically, first shaft 250 is rotatably coupled to turbine mid-frame 140 via a structural member 252 and a first shaft bearing 254. First shaft 250 extends between outer rotor 110 and fan 14 such that fan 14 is rotationally coupled to outer rotor 110 and such that the weight of outer rotor 110 is distributed approximately equally about the circumference of gas turbine engine 10 at forward end 152, via structural member 252.

A second shaft 260 extends between inner rotor 120 and fan 12 such that inner rotor 120 is rotatably coupled to fan 12. In the exemplary embodiment, second shaft 260 is positioned radially inward of first shaft 250. A shaft bearing 262 is coupled to second shaft 260 such that the weight of inner rotor 120 is distributed approximately equally about the circumference of gas turbine engine 10 at forward end 152, via a structural member 252. A shaft bearing 264 is coupled to second shaft 260 such that the weight of inner rotor 120 is distributed approximately equally about the circumference of gas turbine engine 10 at aft end 176, via a structural member 266. More specifically, second shaft 260 is supported at forward end 152 by turbine mid-frame 140 and supported at aft end 176 by turbine rear-frame 132.

Low-pressure turbine 200 also includes a third shaft 270 that rotatably couples outer rotor 110 to turbine rear-frame 132. More specifically, third shaft 270 extends outer rotor aft end 176 to turbine rear-frame 132 such that the weight of outer rotor 110 at an aft end 176 is distributed approximately equally about the circumference of gas turbine engine 10 at aft end 176, via bearing 264 and turbine rear-frame 132. In one embodiment, at least one of bearings 254, 262, and/or 264 is a differential foil bearing. In another embodiment, at least one of bearings 254, 262, and/or 264 is at least one of a differential roller bearing or a differential ball bearing.

In the exemplary embodiment, during engine operation, a radial force generated during rotation of outer rotor 110 is transmitted to bearings 254 and 264. Specifically, as low-pressure turbine 200 rotates, bearings 254 and 264 contact turbine mid-frame 140 and turbine rear-frame 132 respectively to facilitate reducing radial movement of outer rotor 110. Since each respective bearing 254 and 264 is coupled to outer casing 36 through turbine mid-frame 140 and turbine rear-frame 132, outer rotor 110 is maintained in a relatively constant radial position with respect to outer casing 36. More specifically, utilizing straddle-mounted low-pressure turbine 200 that includes an odd number of turbine stages 114 and 124 collectively, that are supported at both ends by bearings 254 and 264 respectively, facilitates eliminating the at least one known differential bearing that is coupled between the concentric low-pressure shafts when an even number of total stages are used in at least one known counter-rotating low-pressure turbine. Moreover, utilizing straddle-mounted low-pressure turbine 200 facilitates reducing the weight of gas turbine engine 10 by eliminating a large over turning moment generated by a known low-pressure turbine that includes an outer rotor having an even number of stages.

The exemplary embodiments described above illustrate a counter-rotating low-pressure turbine having an outer rotor that includes an even number of stages and an inner rotor that includes an odd number of stages such that the outer rotor straddles the inner rotor. Since the outer rotor straddles the inner rotor, the outer rotor is configurable to couple to either the forward or aft fan assembly. Utilizing a straddle-mounted counter-rotating low-pressure turbine facilitates reducing the weight of the gas turbine engine by eliminating the large over turning moment of a conventional low-pressure turbine that includes an outer rotor having an even number of stages. Moreover, the straddle-mounted turbines described herein facilitate handling a blade out event in which a large turbine unbalance may result in the outer rotating casing while also improving gas turbine engine performance by providing increased tip clearance control between the outer rotor and the casing. Moreover, the straddle-mounted turbines described herein facilitate reducing the weight of the turbine rear-frame by distributing the weight of the outer rotor between the turbine mid-frame and turbine rear-frame.

Exemplary embodiments of straddle-mounted counter-rotating low-pressure turbines are described above in detail. The components are not limited to the specific embodiments described herein, but rather, components of each system may be utilized independently and separately from other components described herein. Straddle-mounted turbines can also be used in combination with other known gas turbine engines.

While the invention has been described in terms of various specific embodiments, those skilled in the art will recognize that the invention can be practiced with modification within the spirit and scope of the claims.

What is claimed is:

1. A method for assembling a gas turbine engine, said method comprising:
   providing a low-pressure turbine inner rotor that includes n rows of turbine blade rows configured to rotate in a first direction; and
   rotatably coupling a low-pressure turbine outer rotor to the inner rotor, wherein the outer rotor includes m rows of turbine blade rows that are configured to rotate in a second direction that is opposite the first rotational direction of the inner rotor and such that at least one of the second plurality of turbine blade rows is coupled axially forward of the first plurality of turbine blade rows and wherein m=n+1 and n is greater than 1.

2. A method in accordance with claim 1 wherein providing a low-pressure inner rotor comprises:
   providing an inner rotor that includes an odd number of rows of turbine blades; and
   rotatably coupling an outer rotor that includes an even number of rows of turbine blades to the inner rotor.

3. A method in accordance with claim 1 further comprising:
   providing a first shaft;
   providing a second shaft;
   coupling the first shaft to the outer rotor and to a turbine mid-frame; and
   rotatably coupling the second shaft to the outer rotor and to a turbine rear-frame.

4. A method in accordance with claim 3 further comprising coupling a third shaft between the forward fan assembly and the inner rotor.

5. A method in accordance with claim 3 further comprising coupling a third shaft between the outer rotor and an aft fan assembly.

6. A counter-rotating rotor assembly comprising:
an inner rotor comprising n rows of turbine blades configured to rotate in a first direction; and
an outer rotor comprising m rows of turbine blades configured to rotate in a second direction that is opposite the rotational direction of said inner rotor, said outer rotor coupled within said rotor assembly such that at least one of said second plurality of rows of turbine blades is coupled axially forward of said inner rotor first plurality of rows of turbine blades and wherein m=n+1 and n is greater than 1.

7. A counter-rotating rotor assembly in accordance with claim 6 wherein said inner rotor comprises an odd number of rows of turbine blades and said outer rotor comprises an even number of rows of turbine blades.

8. A counter-rotating rotor assembly in accordance with claim 6 further comprising:
a first shaft coupled between said outer rotor and a turbine mid-frame;
a second shaft coupled to said outer rotor and to a turbine rear-frame; and
a foil bearing coupled between said second shaft and said turbine rear-frame.

9. A counter-rotating rotor assembly in accordance with claim 8 further comprising a third shaft coupled between a forward fan assembly and said inner rotor.

10. A counter-rotating rotor assembly in accordance with claim 8 further comprising a third shaft coupled between said outer rotor and an aft fan assembly.

11. A gas turbine engine comprising:
an inner rotor comprising n rows of turbine blades configured to rotate in a first direction; and
an outer rotor comprising m rows of turbine blades configured to rotate in a second direction that is opposite the rotational direction of said inner rotor, said outer rotor is coupled within said rotor assembly such that at least one of said second plurality of rows of turbine blades is coupled axially forward of said inner rotor first plurality of rows of turbine blades and wherein m=n+1 and n is greater than 1.

12. A gas turbine engine in accordance with claim 11 wherein said inner rotor comprises an odd number of rows of turbine blades and said outer rotor comprises an even number of rows of turbine blades.

13. A gas turbine engine in accordance with claim 11 further comprising:
a first shaft coupled between said outer rotor and a turbine mid-frame;
a second shaft coupled to said outer rotor and to a turbine rear-frame; and
a third shaft coupled between a forward fan assembly and said inner rotor.

14. A method in accordance with claim 3 further comprising coupling the third shaft between the turbine rear-frame and the inner rotor.

15. A method in accordance with claim 9 further comprising coupling the third shaft between the turbine rear-frame and the inner rotor.

* * * * *